May 24, 1932.   B. J. CHROMY   1,859,552
SOUND RECORDING APPARATUS
Filed Feb. 12, 1930
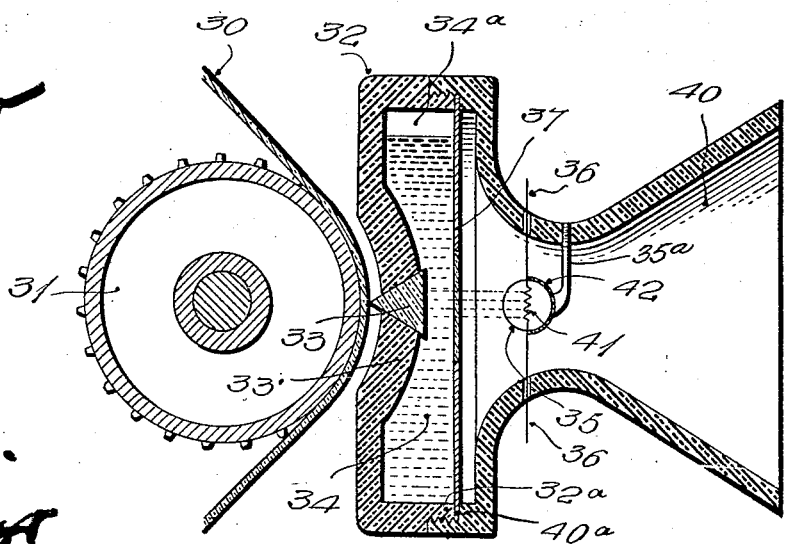
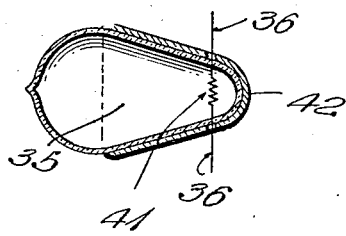
INVENTOR.
Ben J. Chromy,
BY John B. Brady
ATTORNEY.

Patented May 24, 1932

1,859,552

UNITED STATES PATENT OFFICE

BEN J. CHROMY, OF WASHINGTON, DISTRICT OF COLUMBIA, ASSIGNOR TO WIRED RADIO, INC., OF NEW YORK, N. Y., A CORPORATION OF DELAWARE

SOUND RECORDING APPARATUS

Original application filed September 17, 1928, Serial No. 306,541. Divided and this application filed February 12, 1930. Serial No. 427,837.

This invention relates to sound recording systems generally and more specifically to sound recording systems employing a light sensitive film.

This application is a division of my application Serial No. 306,541, filed September 17, 1928 for sound recording apparatus.

An object of this invention is to provide a sound recording apparatus which has a substantially uniform frequency response characteristic.

Another object of this invention is to provide a sound recording device in which the mechanical vibrations are transformed directly into light pulsations at a given point.

A further object of this invention is to provide a sound recording device in which a light absorbing medium intervenes between the light source and the film and in which the intensity of light absorbed is varied in accordance with sound vibrations being recorded.

Other objects and features of this invention will be apparent to anyone skilled in the art of recording sound from the following specification and claims.

A further object of my invention is to provide a sound recording apparatus including a diaphragm arranged to be vibrated by sound waves for varying the dimensions of a liquid light absorbing medium in a direction parallel to light waves which are being modulated by the sound waves for recording sound on a film strip.

In this invention I provide means whereby sound waves are transformed directly into light fluctuations and recorded on a light sensitized surface. This I accomplish by increasing or diminishing the amount of light absorbed between the light sensitive surface and the light source. The intensity of the light given off by the light source remains the same.

In the drawings Fig. 1 shows a cross-sectional view of sound recording device constructed in accordance with my invention; and Fig. 2 illustrates a detailed view of the light source as employed in my invention having a reflector upon the rear surface thereof.

In Fig. 1 of the drawings the reference character 30 designates a film strip and 31 designates a sprocket for moving the film strip past a quartz light-ray concentrating member 33. The light ray concentrating member 33 is mounted in an aperture in the back 33' of the casing 32. A diaphragm 37 is clamped between the edges of the side wall 32a of the casing 32 and the flange 40a of the speaking tube 40. The side wall 32a and the flange 40a are each threaded.

The casing 32 may be made of phenol condensation products, hard rubber or any other insulating material. The diaphragm 37 may be made of transparent material, such as celluloid, or it may be made of very thin sheet metal, such as steel or bronze, and an aperture of thin quartz may be provided in its center in axial alignment with the concentrating member 33 and the lamp 35.

A light absorbing liquid, such as a solution of calcium chloride or a solution of potassium permanganate or various kinds of oils, partially fills the compartment 34. A small empty space 34a is left at the top of the compartment 34.

The incandescent lamp 35 is suitably supported in the constricted portion of the speaking tube 50 and is connected by the leads 36, which extend to the filament 41 of the lamp. The source of electric current for heating the filament 41 of the lamp 35 is connected to the leads 36. A small parabolic reflector 42, as illustrated in Fig. 2 may be provided on one side of the lamp 35 to concentrate the light rays of the lamp upon the member 33 and to prevent the light rays from the lamp from annoying the person speaking into the tube. The lamp 35 is preferably very small, such as is often used in surgical instruments. These lamps usually have incorporated in them a small reflector for concentrating the light rays transmitted from the filament in a small well defined pencil beam. The lamp 35 is rigidly supported by the arm 35a to prevent its movement with respect to the tube 40.

In the operation of my invention mechanical vibrations impinge upon the diaphragm 37 and cause the length of the path of the light rays through the light absorbing liquid in the compartment 34 between the lamp 35 and the film 30 to increase or diminish in accordance with the character of these vibrations. The light rays reaching the film 30 will be modulated in accordance with these vibrations and the character of these vibrations will be recorded upon the film.

While I have described my invention in one of its preferred embodiments, I desire that it be understood that modifications may be made and that no limitations are intended other than are imposed by the scope of the appended claims.

What I claim as new and desire to secure by Letters Patent of the United States is as follows:

1. In a sound recording device, the combination of a light sensitive film strip, a diaphragm adapted to be actuated by mechanical vibrations, a light source positioned adjacent said diaphragm, and a body of fluid confined against said diaphragm for varying the effect of said light source upon said film, the movement of said body of fluid being governed by mechanical vibrations impinging upon said diaphragm.

2. In a device for recording sound upon a sensitized film, the combination of a light sensitive film strip, a diaphragm adapted to be vibrated by sound waves, a light source, means for directing a pencil of light from said light source to said sensitive film and liquid light absorbing means displaceable in position in relation to the movement of said diaphragm, said light absorbing means being interposed in the path of said pencil of light for varying the effect of said light source with respect to said film in accordance with sound waves impinging upon said diaphragm.

3. In sound recording devices, the combination of a light sensitive recording film, a light source, a light absorbing medium of fluid consistency interposed between said light source and said recording film, and means for varying the dimension of said light absorbing medium in a direction coincident with the path of the light rays traveling from said source to said film in accordance with mechanical vibrations to be recorded on said film.

4. In sound recording devices, the combination of a light sensitive recording film, a light source, a diaphragm, a light absorbing medium said diaphragm operating to confine said light absorbing medium between said light source and said recording film, and responsive to mechanical vibrations impinging on the surface thereof, whereby the dimension of said absorbing medium along the path of said light rays is varied in accordance with the amplitude of mechanical vibrations impinging on said diaphragm.

5. In light modulating devices, the combination of a light source, and a light absorbing medium, a pencil of light rays from said light source being directed through said light absorbing medium, and means for impressing forces upon said light absorbing medium in the direction of said light rays, whereby the molecular structure of said medium is varied for modulating said pencil of light rays in accordance with pulsations affecting said light absorbing medium.

6. The method of modulating a beam of light rays comprising directing a beam of light rays upon a light absorbing medium of fluid consistency, directing sound rays upon a diaphragm positioned adjacent to said medium, and displacing said absorbing medium with respect to said diaphragm so that light from said beam is absorbed in variable quantities.

In testimony whereof I affix my signature.

BEN J. CHROMY.